United States Patent
Bastide et al.

(10) Patent No.: US 11,108,713 B2
(45) Date of Patent: *Aug. 31, 2021

(54) ENSURING THAT ALL USERS OF A GROUP MESSAGE RECEIVE A RESPONSE TO THE GROUP MESSAGE

(71) Applicant: International Business Machines Corporation, Armonk, NY (US)

(72) Inventors: Paul R. Bastide, Ashland, MA (US); Jana H. Jenkins, Raleigh, NC (US); Robert E. Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,835

(22) Filed: Jan. 17, 2020

(65) Prior Publication Data

US 2020/0153764 A1 May 14, 2020

Related U.S. Application Data

(63) Continuation of application No. 15/402,842, filed on Jan. 10, 2017, now Pat. No. 10,608,967.

(51) Int. Cl.
*H04L 12/58* (2006.01)
*H04L 12/18* (2006.01)
(Continued)

(52) U.S. Cl.
CPC .......... *H04L 51/04* (2013.01); *G06Q 10/107* (2013.01); *H04L 12/1863* (2013.01);
(Continued)

(58) Field of Classification Search
CPC ..... H04L 12/1863; H04L 51/04; H04L 51/16; H04L 51/34; H04L 51/36; H04L 63/0245; H04W 12/02; G06Q 10/107
See application file for complete search history.

(56) References Cited

U.S. PATENT DOCUMENTS 8,532,609 B2  9/2013  Spector
9,258,688 B2  2/2016  Hulan
(Continued)

FOREIGN PATENT DOCUMENTS

CA  2964914 A1 *  5/2018

OTHER PUBLICATIONS

Office Action for U.S. Appl. No. 16/664,473 dated Aug. 20, 2020, pp. 1-13.
(Continued)

*Primary Examiner* — Aaron N Strange
(74) *Attorney, Agent, or Firm* — Robert A. Voigt, Jr.; Winstead PC

(57) ABSTRACT

A method, system and computer program product for ensuring that all users of a group message receive a response to the group message. The content of a detected group message is analyzed to determine if the group message requires a response and, if so, to assess the urgency of the response. If the analyzed group message requires a response, then a determination is made as to whether a response was received by all or a subset of the users of the group message (sender and recipients of the group message) within a threshold amount of time based on the urgency of the response. If the response was only received by a subset of the users of the group message, then the response is broadcasted to the other users of the group message who had not previously received the response if no confidential information is detected in the response.

20 Claims, 5 Drawing Sheets

(51) Int. Cl.
*H04L 29/06* (2006.01)
*H04W 12/02* (2009.01)
*G06Q 10/10* (2012.01)

(52) U.S. Cl.
CPC .............. *H04L 51/16* (2013.01); *H04L 51/34* (2013.01); *H04L 51/36* (2013.01); *H04L 63/0245* (2013.01); *H04W 12/02* (2013.01)

(56) References Cited

U.S. PATENT DOCUMENTS

| | | | |
|---|---|---|---|
| 9,325,511 B2 | 4/2016 | Helbling et al. | |
| 9,363,223 B2 | 6/2016 | Arquette et al. | |
| 9,380,015 B2 | 6/2016 | Turski et al. | |
| 2005/0138430 A1* | 6/2005 | Landsman | H04L 63/104 726/4 |
| 2006/0059495 A1* | 3/2006 | Spector | G08B 27/00 719/310 |
| 2006/0200426 A1* | 9/2006 | Baker | G06Q 10/10 705/64 |
| 2008/0313736 A1 | 12/2008 | Baum-Waidner et al. | |
| 2009/0270120 A1 | 10/2009 | Park | |
| 2010/0057754 A1* | 3/2010 | Moudy | G06Q 20/382 707/E17.044 |
| 2010/0281123 A1 | 11/2010 | Greenberg | |
| 2011/0258275 A1 | 10/2011 | Rao | |
| 2012/0069131 A1 | 3/2012 | Abelow | |
| 2012/0072855 A1* | 3/2012 | Baldwin | G06Q 10/1093 715/752 |
| 2012/0123854 A1 | 5/2012 | Anderson et al. | |
| 2013/0007148 A1 | 1/2013 | Olsen | |
| 2013/0066984 A1 | 3/2013 | Shin | |
| 2013/0110956 A1* | 5/2013 | Barman | H04L 51/08 709/206 |
| 2014/0096034 A1 | 4/2014 | Blair | |
| 2014/0122605 A1 | 5/2014 | Merom et al. | |
| 2014/0221006 A1 | 8/2014 | Jhanji | |
| 2014/0258158 A1 | 9/2014 | Levy | |
| 2014/0289343 A1* | 9/2014 | Turakhia | H04L 12/1822 709/206 |
| 2015/0215241 A1* | 7/2015 | Zhou | H04L 51/16 709/206 |
| 2016/0099895 A1 | 4/2016 | Crawford | |
| 2016/0198324 A1 | 7/2016 | Dabbs, III et al. | |
| 2016/0205197 A1 | 7/2016 | Yasrebi et al. | |
| 2016/0269341 A1 | 9/2016 | Kumar et al. | |
| 2017/0180276 A1 | 6/2017 | Gershony et al. | |
| 2017/0262497 A1 | 9/2017 | Befort et al. | |
| 2017/0279743 A1* | 9/2017 | Yang | H04L 12/185 |
| 2017/0346820 A1 | 11/2017 | Valla | |
| 2018/0027068 A1* | 1/2018 | Kumar | H04L 67/1044 709/206 |
| 2018/0054378 A1 | 2/2018 | Bastide et al. | |
| 2018/0121034 A1 | 5/2018 | Baker et al. | |
| 2018/0183618 A1 | 6/2018 | Jayaram et al. | |
| 2018/0198746 A1 | 7/2018 | Bastide et al. | |
| 2018/0210874 A1 | 7/2018 | Fuxman et al. | |
| 2018/0225230 A1 | 8/2018 | Litichever et al. | |

OTHER PUBLICATIONS

List of IBM Patents or Patent Applications Treated as Related, Jan. 21, 2020, pp. 1-2.

Anonymously, "Sender Controlled Alert Notification for Receivers of Messages to Mobile Devices," IP.com, IP.com No. IPCOM000201324D, Nov. 10, 2010, pp. 1-3.

On et al., "Messaging Behavior Modeling in Mobile Social Networks," IEEE International Conference on Social Computing/IEEE International Conference on Privacy, Security, Risk and Trust, Minneapolis, Minnesota, USA, Aug. 20-22, 2010, pp. 425-430.

Bacanh et al., "Opportunistic Message Broadcasting in Campus Environments," 2015 IEEE Global Communications Conference (GLOBECOM), Dec. 6-10, 2015, pp. 1-6.

\* cited by examiner

ENSURING THAT ALL USERS OF A GROUP MESSAGE RECEIVE A RESPONSE TO THE GROUP MESSAGE

TECHNICAL FIELD

The present invention relates generally to communications, and more particularly to ensuring that all users of a group message (sender and recipients of a message sent to multiple users) receive a response to the group message.

BACKGROUND

There are many different ways to communicate with other users, such as via e-mail, instant messaging, text messaging, etc.

Oftentimes, a message may be sent to multiple users, such as a group message (a message sent to a group of users). However, one of the recipients of the group message may not respond to all the users of the group message (both the sender and all the recipients of the group message). For example, a group message may be sent via e-mail to a primary recipient by a sender while cc'ing other users. At times, the primary recipient of the message may respond to the sender directly in a different channel (e.g., via instant message) than the channel used to send the group message (e.g., via e-mail). As a result, the response to the sender may not be received by the other recipients of the group message. The other recipients of the group message may be waiting to receive a response, such as those recipients who were cc'd in the original message. These other recipients may follow-up with the primary recipient to see if the user has responded to the group message. The user would then have to resend or repeat the same response message to the other recipients of the group message. Such a process is laborsome and counterproductive.

SUMMARY

In one embodiment of the present invention, a method for ensuring that all users of a group message receive a response to the group message comprises monitoring messages sent over a communication network. The method further comprises detecting a group message from the monitored messages that was sent to multiple users. The method additionally comprises analyzing content of the group message to determine if the group message requires a response and, if so, to assess an urgency of the response, where the group message requires a response due to a question or action item presented in the group message. Furthermore, the method comprises determining whether a response to the group message was sent and received by all users of the group message within a threshold amount of time based on the urgency of the response in response to the group message requiring the response, where the users of the group message comprise a sender and recipients of the group message. Additionally, the method comprises determining whether the response to the group message was sent and received by a subset of all users of the group message within the threshold amount of time in response to determining that the response to the group message was not received by all users of the group message within the threshold amount of time. In addition, the method comprises broadcasting the response to the group message to other users of the group message who had not previously received the response in response to determining that the response to the group message was received by the subset of all users of the group message within the threshold of time.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for ensuring that all users of a group message receive a response to the group message. In one embodiment of the present invention, a message analyzer monitors the messages sent over a communication network. A message (group message) out of the monitored messages that is sent to multiple users is detected. The content of the group message is analyzed to determine if the group message requires a response and, if so, to assess the urgency of the response. In one embodiment, a message requires a response due to a question or action item presented in the message. If the analyzed group message requires a response, then a determination is made by the message analyzer as to whether a response was received by all or a subset of the users of the group message within a threshold amount of time based on the urgency of the response. As used herein, "users of the group message" refer to both the sender and the recipients of the group message. If the response was only received by a subset of the users of the group message, then the response is analyzed for confidential information. If no confidential information is detected in the response, then the response is broadcasted to the other users of the group message who had not previously received the response. In this manner, all users of a group message (recipients and sender) can be ensured of receiving a response to the group message when the response was received by only a subset of the users of the group message without requiring the resending of the response by a user (e.g., sender of the response) to the other users of the group message who failed to receive the original response.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
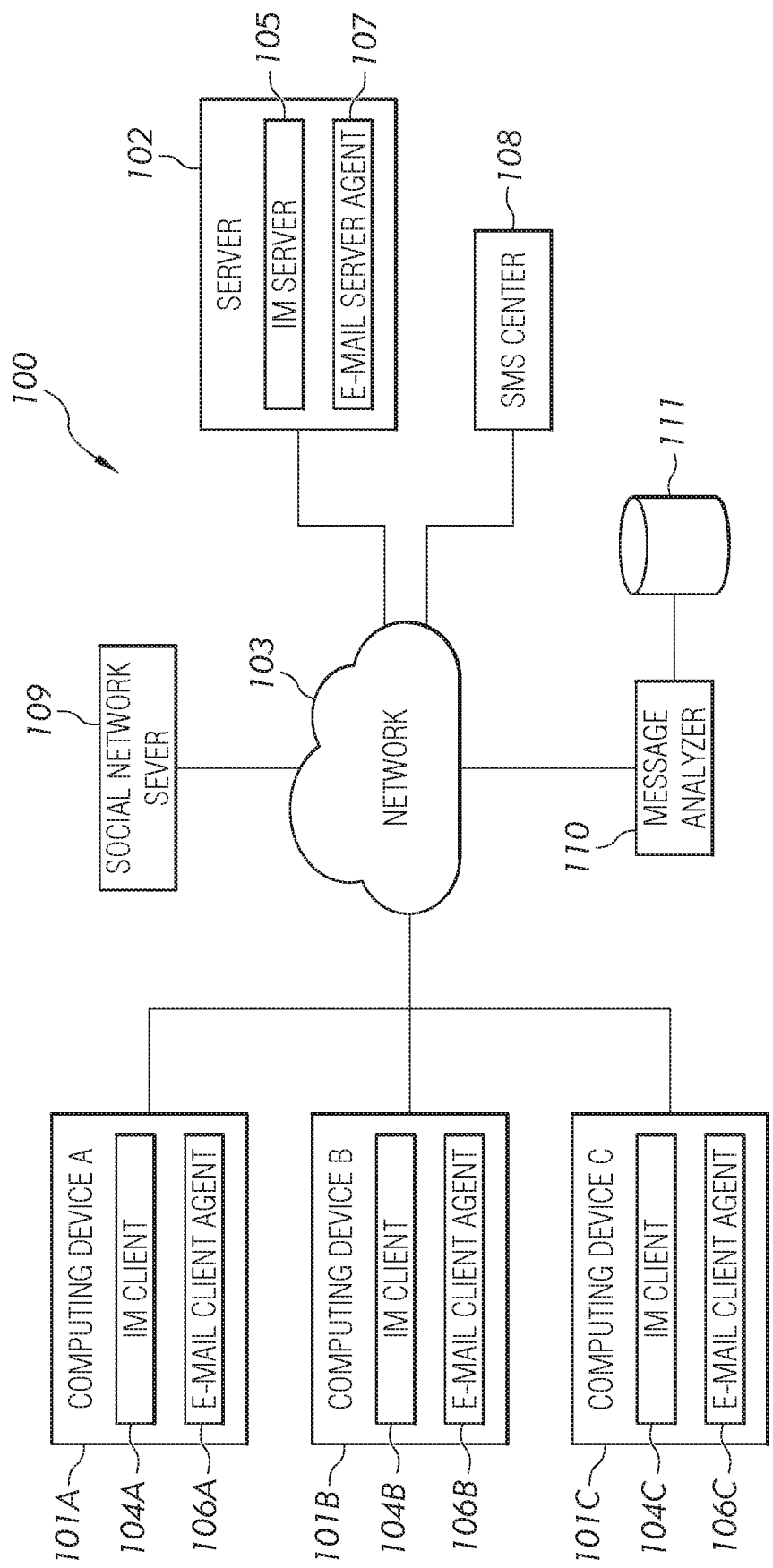
FIG. 1 illustrates a communication system configured in accordance with an embodiment of the present invention.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other computing devices 101 and server 102.

Computing devices 101 may be configured to send and receive text-based messages in real-time during an instant messaging session. Any user of computing device 101 may be the creator or initiator of an instant message (message in instant messaging) and any user of computing device 101 may be a recipient of an instant message. Furthermore, any user of computing device 101 may be able to create, receive and send e-mails. Additionally, any user of computing device 101 may be able to send and receive text messages, such as Short Message Services (SMS) messages.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing devices 101A-101C may include a software agent, referred to herein as the Instant Messaging (IM) client 104A-104C, respectively. Instant messaging clients 104A-104C may collectively or individually be referred to as instant messaging clients 104 or instant messaging client 104, respectively. Furthermore, server 102 may include a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for computing device 101 to connect to the IM server 105 which provides the functionality of distributing the instant messages to the IM clients 104 associated with each of the sharing users.

Computing device 101A-101C may further include a software agent, referred to herein as the e-mail client agent 106A-106C, respectively. E-mail client agents 106A-106C may collectively or individually be referred to as e-mail client agents 106 or e-mail client agent 106, respectively. Furthermore, server 102 may include a software agent, referred to herein as the e-mail server agent 107. E-mail client agent 106 enables the user of computing device 101 to create, send and receive e-mails. E-mail server agent 107 is configured to receive e-mail messages from computing device 101 and distribute the received e-mail messages among the one or more computing devices 101.

While the preceding discusses each computing device 101 as including an IM client 104 and an e-mail client agent 106, each computing device 101 may not necessarily include each of these software agents. Furthermore, while the preceding discusses a single server 102 including the software agents, such as IM server 105 and e-mail server agent 107, multiple servers may be used to implement these services. Furthermore, each server 102 may not necessarily be configured to include all of these software agents, but only a subset of these software agents.

System 100 further includes a Short Message Service (SMC) center 108 configured to relay, store and forward text messages, such as SMS messages, among computing devices 101 through network 103.

System 100 further includes a social network server 109, which may be a web server configured to offer a social networking and/or microblogging service, enabling users of computing devices 101 to send and read other users' posts. "Posts," as used herein, include any one or more of the following: text (e.g., comments, sub-comments and replies), audio, video images, etc. Social network server 109 is connected to network 103 by wire or wirelessly. While FIG. 1 illustrates a single social network server 109, it is noted for clarity that multiple servers may be used to implement the social networking and/or microblogging service.

System 100 further includes what is referred to herein as the "message analyzer" 110 connected to network 103 by wire or wirelessly. Message analyzer 110 is configured to ensure that all users of a group message (sender and recipients of the group message) receive a response to the group message when the response was received by only a subset of the users of the group message as discussed further below in connection with FIGS. 3A-3B. As used herein, "users of the group message" refer to both the sender and the recipients of the group message. Furthermore, message analyzer 110 is configured to broadcast the response to other users (other users besides the users of the group message) who received a message involving a similar question that was queried in the group message as discussed further below in connection with FIG. 4. A description of the hardware configuration of message analyzer 110 is provided below in connection with FIG. 2.

Additionally, as shown in FIG. 1, message analyzer 110 is connected to a database 111 configured to store questions as well as identifications of the senders and recipients of messages containing such stored questions. In one embodiment, such questions and identifications are obtained from messages sent over a communication network (e.g., network 103) that were monitored and analyzed. In one embodiment, database 111 is further configured to store group messages that require a response as well as the question or action item in the group message requiring a response and the assessed urgency of the response. A more detailed description of these features will be discussed further below in connection with FIGS. 3A-3B and 4.

System 100 is not to be limited in scope to any one particular network architecture. System 100 may include any number of computing devices 101, servers 102, networks 103, SMS centers 108, social network servers 109, message analyzers 110 and databases 111.

Figure 2:
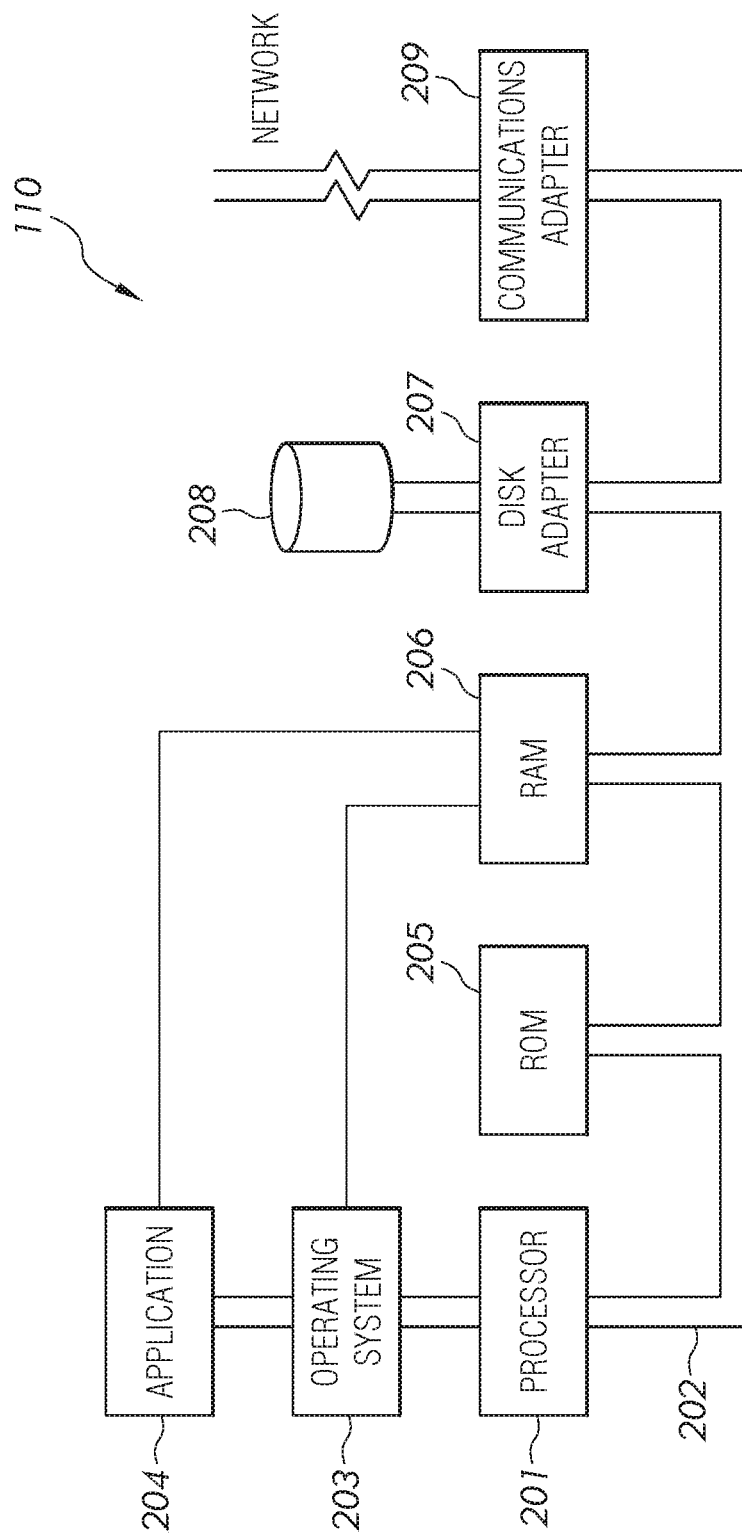
FIG. 2 illustrates a hardware configuration of a message analyzer in accordance with an embodiment of the present invention.

Referring now to FIG. 2, FIG. 2 illustrates an embodiment of the present invention of a hardware configuration of message analyzer 110 (FIG. 1) which is representative of a hardware environment for practicing the present invention. Referring to FIG. 2, message analyzer 110 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, programs for ensuring that all users of a group message (sender and recipients of the group message) receive a response to the group message when the response was received by only a subset of the users of the group message as well as broadcasting the response to other users (other users besides the users of the group message) who received a message involving a similar question that was queried in the group message as discussed further below in connection with FIGS. 3A-3B and 4.

Referring again to FIG. 2, read-only memory ("ROM") 205 is coupled to system bus 202 and includes a basic input/output system ("BIOS") that controls certain basic functions of message analyzer 110. Random access memory ("RAM") 206 and disk adapter 207 are also coupled to system bus 202. It should be noted that software components including operating system 203 and application 204 may be loaded into RAM 206, which may be message analyzer's 110 main memory for execution. Disk adapter 207 may be an integrated drive electronics ("IDE") adapter that communicates with a disk unit 208, e.g., disk drive. It is noted that the programs for ensuring that all users of a group message receive a response to the group message when the response was received by only a subset of the users of the group message as well as broadcasting the response to other users (other users besides the users of the group message) who received a message involving a similar question that was queried in the group message, as discussed further below in connection with FIGS. 3A-3B and 4, may reside in disk unit 208 or in application 204.

Message analyzer 110 further includes a communications adapter 209 coupled to bus 202. Communications adapter 209 interconnects bus 202 with an outside network (e.g., network 103 of FIG. 1) thereby allowing message analyzer 110 to communicate with other devices, such as computing devices 101, servers 102, SMS centers 108 and social network servers 109.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, oftentimes, a message may be sent to multiple users, such as a group message (a message sent to a group of users). However, one of the recipients of the group message may not respond to all the users of the group message (both the sender and all the recipients of the group message). For example, a group message may be sent via e-mail to a primary recipient by a sender while cc'ing other users. At times, the primary recipient of the message may respond to the sender directly in a different channel (e.g., via instant message) than the channel used to send the group message (e.g., via e-mail). As a result, the response to the sender may not be received by the other recipients of the group message. The other recipients of the group message may be waiting to receive a response, such as those recipients who were cc'd in the original message. These other recipients may follow-up with the primary recipient to see if the user has responded to the group message. The user would then have to resend or repeat the same response message to the other recipients of the group message. Such a process is laborsome and counterproductive.

The principles of the present invention provide a means for ensuring that all users of a group message (sender and recipients of the group message) receive a response to the group message when the response was received by only a subset of the users of the group message without requiring the resending of the response by a user (e.g., sender of the response) to those other users of the group message who failed to receive the original response as discussed below in connection with FIGS. 3A-3B. Furthermore, the principles of the present invention provide a means for broadcasting the response to the group message to other users (other users besides the users of the group message) who received a message involving a similar question that was queried in the group message as discussed below in connection with FIG. 4.

Figure 3A:
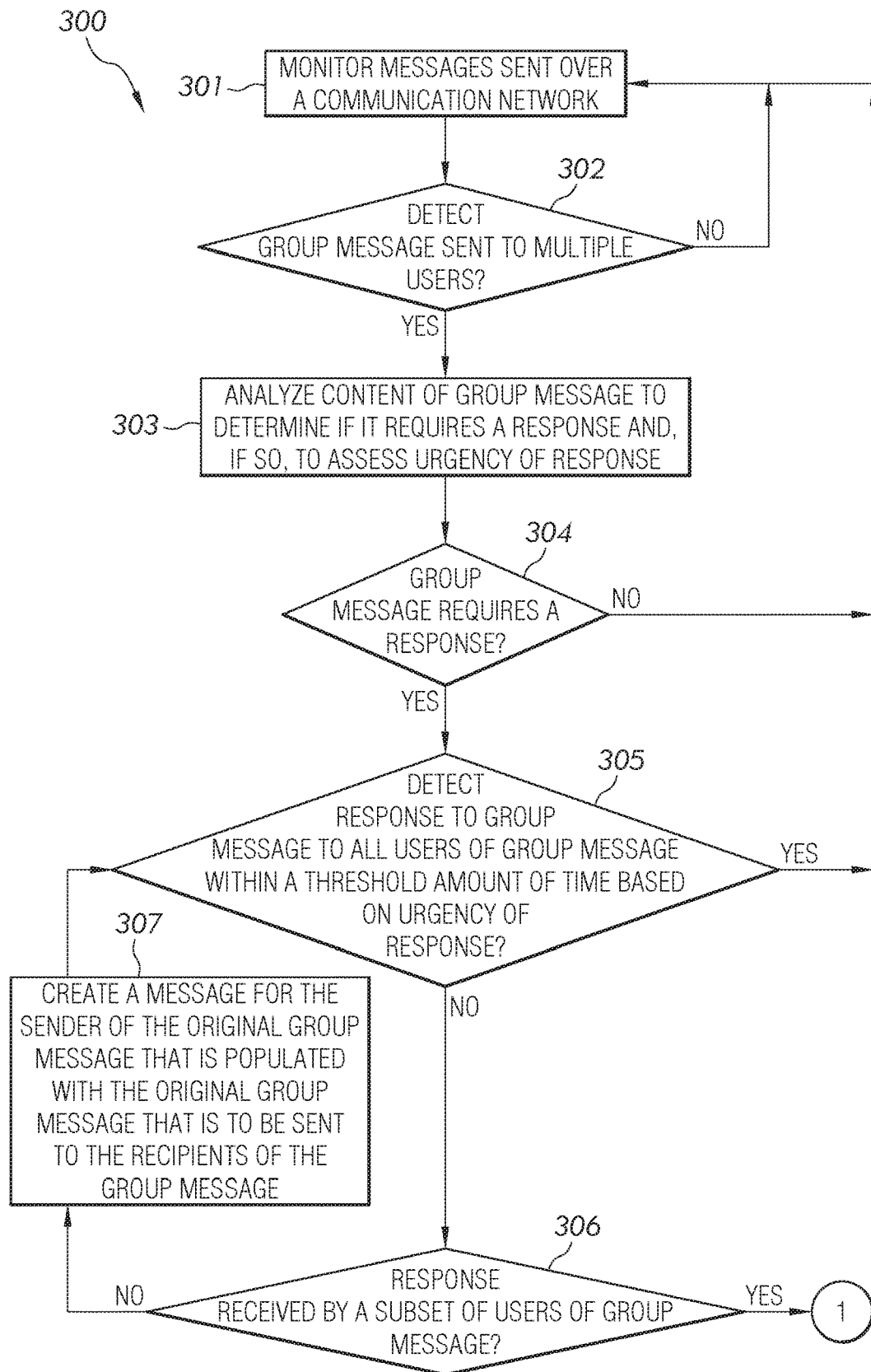
FIGS. 3A-3B are a flowchart of a method for ensuring that all users of a group message (recipients and sender) receive a response to the group message when the response was received by only a subset of the users of the group message in accordance with an embodiment of the present invention.
Figure 3B:
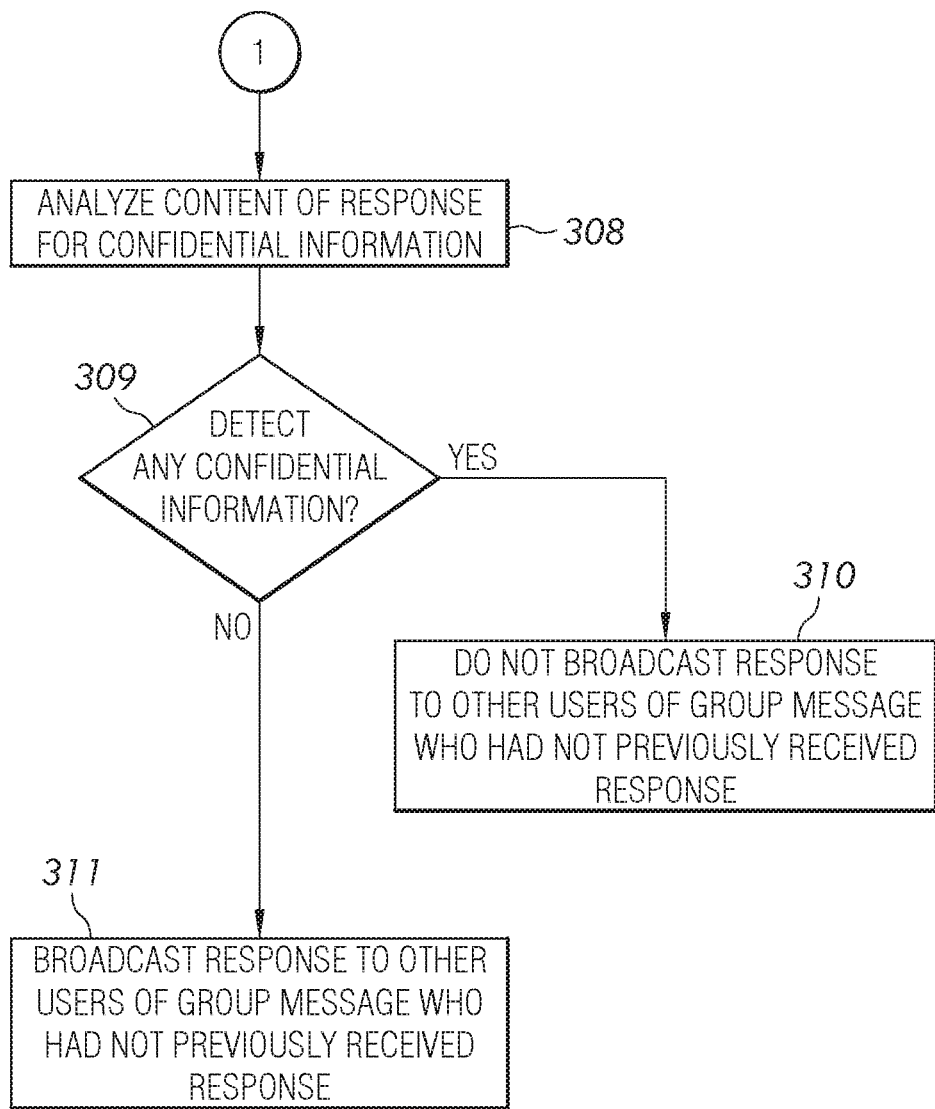

FIGS. 3A-3B are a flowchart of a method 300 for ensuring that all users of a group message (sender and recipients of the group message) receive a response to the group message when the response was received by only a subset of the users of the group message in accordance with an embodiment of the present invention.

Referring to FIG. 3A, in conjunction with FIGS. 1-2, in step 301, message analyzer 110 monitors the messages sent over a communication network (e.g., network 103).

In step 302, a determination is made by message analyzer 110 as to whether it detected a message (group message) out of the monitored messages that was sent to multiple users. In one embodiment, message analyzer 110 detects a group message based on identifying the number of recipients of a message (e.g., e-mail message, instant message). If there are multiple recipients to receive a message sent by a sender, then such a message is a group message.

If message analyzer 110 did not detect a group message out of the monitored messages, then message analyzer 110 continues to monitor the messages sent over a communication network in step 301.

If, however, message analyzer 110 detects a group message out of the monitored messages, then, in step 303, message analyzer 110 analyzes the content of the group message to determine if the message requires a response and, if so, to assess the urgency of the response. In one embodiment, a message requires a response due to a question or action item presented in the message. In one embodiment, message analyzer utilizes natural language processing to detect a question presented in the message. For example, message analyzer 110 may search for certain punctuation marks (e.g., "?") that indicate a question is being asked. In another example, message analyzer 110 may search for certain words (e.g., "why," "how") that indicate a question is being asked.

An action item is a documented event, task, activity, or action that needs to take place. Action items are usually created during a discussion by a group of people who are meeting about one or more topics and during the discussion it is discovered that some kind of action is needed. The action required is then documented as an action item and usually assigned to someone, usually a member of the group. The person to whom the action is assigned is then obligated to perform the action and report back to the group on the results. In one embodiment, message analyzer 110 utilizes natural language processing to determine if there is an action item in the analyzed message that requires a response to a group of users based on detecting keywords, such as "meeting minutes" in connection with a "task list."

In one embodiment, the urgency of a message requiring a response is determined by message analyzer 110 using natural language processing. For example, message analyzer 110 may identify keywords, such as "urgent" and "as soon as possible," to indicate a response that is highly urgent. In another example, message analyzer 110 may determine that a message is non-urgent in the absence of terms indicating urgency or in response to keywords, such as "no hurry," that indicate a lack of an urgency in responding to the group message.

In step 304, a determination is made by message analyzer 110 as to whether the analyzed group message requires a response. If the analyzed group message does not require a response, then message analyzer 110 continues to monitor the messages sent over a communication network in step 301.

If, however, the analyzed group message requires a response, then, in step 305, a determination is made by message analyzer 110 as to whether it detects a response to the group message to all the users of the group message within a threshold amount of time based on the urgency of the response. As used herein, "users of the group message" refer to both the sender and the recipients of the group message.

As discussed above, in step 303, message analyzer 110 analyzes the content of the group message to determine if the message requires a response and, if so, to assess the urgency of the response. Such an urgency of the response is used to determine the threshold amount of time in which a response to the group message should be received by all the users of the group message. A highly urgent response would require such a response sooner (e.g., 1 day to receive the response by all the users of the group message) than a non-urgent response (e.g., 3 days to receive the response by all the users of the group message).

If a response to the group message has been sent to all the users of the group message within the threshold amount of time, then message analyzer 110 continues to monitor the messages sent over a communication network in step 301.

If, however, a response to the group message has not been sent to all the users of the group message within the threshold amount of time, then, in step 306, a determination is made by message analyzer 110 as to whether the response was sent and received by a subset of the users of the group message.

If a response has not been sent and received by a subset of the users of the group message, then the group message has not been sent to any of the users of the group message within the threshold amount of time. As a result, in step 307, message analyzer 110 creates a message for the sender of the original group message (group message analyzed in step 303 that was determined to require a response) that is populated with the original group message that is to be sent to the recipients of the group message. In this manner, message analyzer 110 is informing the sender that a response has not yet been received to the previously sent group message and that a follow-up message needs to be sent out in order to remind the recipients to please respond to the request.

After creating the follow-up message, a determination is made by message analyzer 110 as to whether it detects a response to the follow-up group message to all the users of the group message within the threshold amount of time in step 305. In one embodiment, the threshold deadline for having received a response to the group message by all the users of the group message is determined from the time that the follow-up message was sent.

Referring to FIG. 3B, if, however, a response to the group message was only received by a subset of the users of the group message, then, in step 308, message analyzer 110 analyzes the content of the response for any confidential information.

For example, if a sender sent out a group message to three people via e-mail and one of the recipients directly responded to the sender (whether using the same communication channel, such as e-mail, or a different communication channel, such as instant messaging) without cc'ing the other users who received the group message, then the response is said to have only been received by a subset of the users of the group message. In such a scenario, the content of the response is analyzed for confidential information.

In one embodiment, message analyzer 110 analyzes the response for confidential information utilizing natural language processing. For example, message analyzer 110 may search for keywords (e.g., "confidential," "restricted information") that indicates confidential information. In another example, message analyzer 110 may identify any tags associated with the response that indicate that the response contains confidential information.

In step 309, a determination is made by message analyzer 110 as whether it detects any confidential information in the response.

If message analyzer 110 detects any confidential information in the response, then, in step 310, message analyzer 110 does not broadcast the response to the other users of the group message who had not previously received the response.

If, however, message analyzer 110 does not detect any confidential information in the response, then, in step 311, message analyzer 110 broadcasts the response to the other users of the group message who had not previously received the response. In one embodiment, the response is broadcasted over the same communication channel (e.g., e-mail) as the communication channel used to send out the originally sent group message even if the response that was sent to the subset of the users of the group message was sent on a different communication channel (e.g., instant messaging).

In this manner, all users of a group message (recipients and sender) can be ensured of receiving a response to the group message when the response was received by only a subset of the users of the group message without requiring the resending of the response by a user (e.g., sender of the response) to the other users of the group message who failed to receive the original response.

Furthermore, the present invention provides a means for broadcasting the response to the group message to other users (other users besides the users of the group message) who received a message involving a similar question that was queried in the group message as discussed below in connection with FIG. 4.

Figure 4:
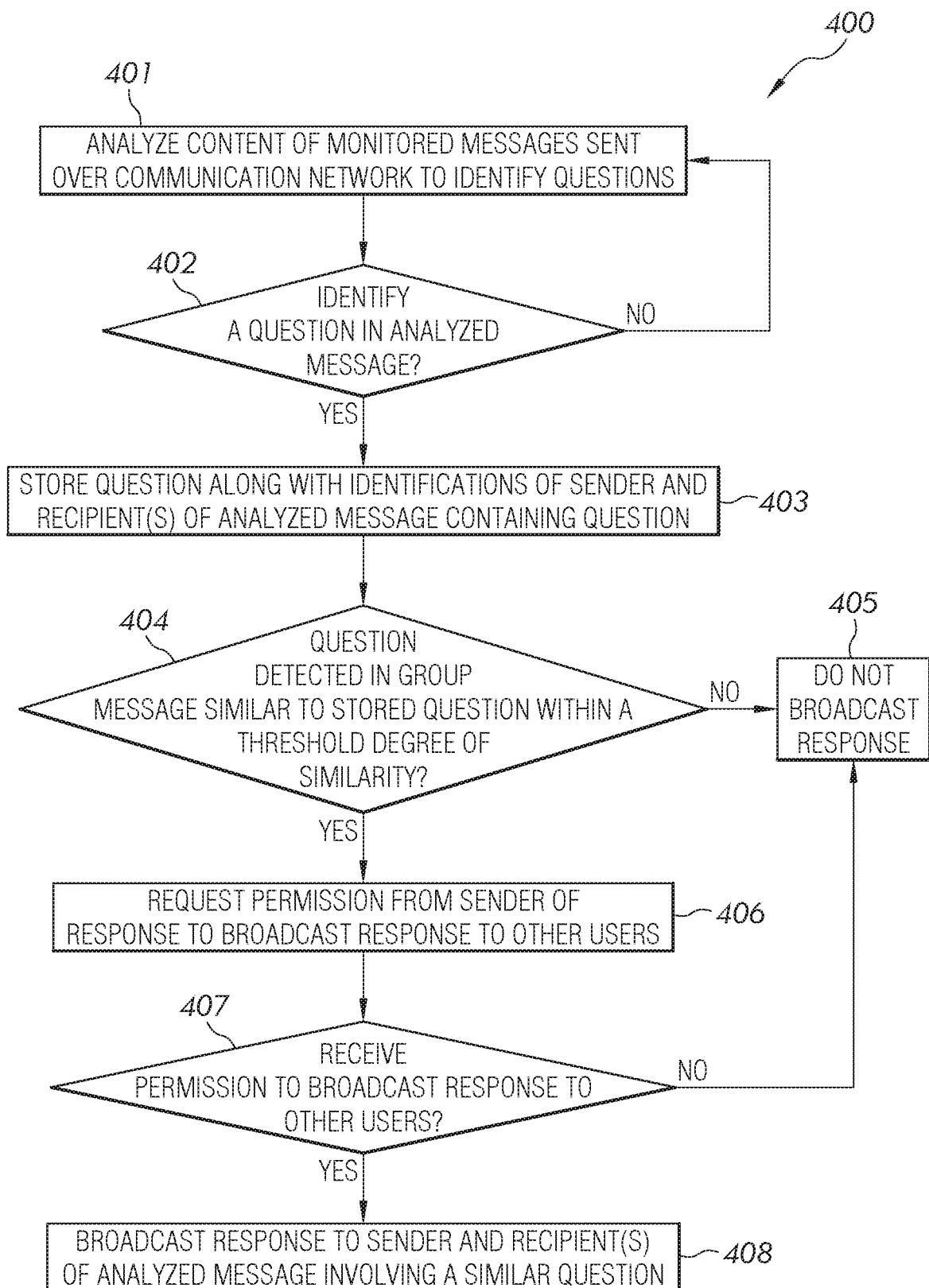
FIG. 4 is a flowchart of a method for broadcasting the response to the group message to other users who received a message involving a similar question that was queried in the group message in accordance with an embodiment of the present invention.

FIG. 4 is a flowchart of a method 400 for broadcasting the response to the group message to other users (other users besides the users of the group message) who received a message involving a similar question that was queried in the group message in accordance with an embodiment of the present invention.

Referring to FIG. 4, in conjunction with FIGS. 1-2 and 3A-3B, in step 401, message analyzer 110 analyzes the content of the monitored messages (see step 301) sent over the communication network (e.g., network 103) to identify questions.

In one embodiment, message analyzer utilizes natural language processing to detect a question presented in a message. For example, message analyzer 110 may search for certain punctuation marks (e.g., "?") that indicate a question is being asked. In another example, message analyzer 110 may search for certain words (e.g., "why," "how") that indicate a question is being asked.

In step 402, a determination is made as to whether message analyzer 110 detects a question in the analyzed message.

If a question was not detected, then message analyzer 110 continues to analyze the content of the monitored messages (see step 301) sent over the communication network to identify questions in step 401.

If, however, a question was detected, then, in step 403, message analyzer 110 stores the question along with the identifications of the sender and recipient(s) of the analyzed message containing the question, such as in database 111.

In step 404, a determination is made by message analyzer 110 as to whether the question detected in the group message (see step 303) is similar to a stored question within a threshold degree of similarity.

As discussed above, the group message is analyzed in step 303 to determine if it requires a response, such as detecting a question being asked in the group message. Such a question is compared to the stored questions discussed in step 403 to determine if the question being asked in the group message is within a threshold degree of similarity of one of these stored questions.

In one embodiment, the threshold degree of similarity is user-selected.

In one embodiment, message analyzer 110 utilizes natural language processing to identify the number of terms in the question of the group message and in the stored questions discussed in step 403 that have similar meaning. The higher the correlation, the more likely that the questions are similar. Such a correlation may be assessed a value which is compared to a threshold value.

If the question detected in the group message (see step 303) is not similar to a stored question within a threshold degree of similarity, then, in step 405, message analyzer 110 does not broadcast the response to the group message.

If, however, the question detected in the group message (see step 303) is similar to a stored question within a threshold degree of similarity, then, in step 406, message analyzer 110 requests permission from the sender of the response to broadcast the response to other users (other users besides the users of the group message).

In step 407, a determination is made by message analyzer 110 as to whether the sender of the response provided permission to broadcast the response to other users.

If the sender of the response did not provide permission to broadcast the response to other users, then message analyzer 110 does not broadcast the response to the group message in step 405.

If, however, the sender of the response provided permission to broadcast the response to other users, then, in step 408, message analyzer 110 broadcasts the response to the sender and recipient(s) of the analyzed message involving a similar question. In one embodiment, the sender and recipient(s) of the analyzed message are obtained from database 111.

In this manner, other users, such as users in different social networking systems, may obtain the benefit of the knowledge discussed in the response to the group message which may assist those users in answering a question previously queried by them.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for ensuring that all users of a group message receive a response to the group message, the computer program product comprising a computer readable storage medium having program code embodied therewith, the program code comprising the programming instructions for:

monitoring messages sent over a communication network;

detecting a group message from said monitored messages that was sent to multiple users;

analyzing content of said group message to determine if said group message requires a response and, if so, to assess an urgency of said response, wherein said group message requires a response due to a question or action item presented in said group message;

determining whether a response to said group message was sent and received by all users of said group message within a threshold amount of time based on said urgency of said response in response to said group message requiring said response, wherein said users of said group message comprise a sender and recipients of said group message;

determining whether said response to said group message was sent and received by a subset of all users of said group message within said threshold amount of time in response to determining that said response to said group message was not received by all users of said group message within said threshold amount of time; and broadcasting said response to said group message to other users of said group message who had not previously received said response in response to determining that said response to said group message was received by said subset of all users of said group message within said threshold of time.

2. The computer program product as recited in claim 1, wherein the program code further comprises the programming instructions for:

creating a follow-up group message for said sender of said group message that is populated with said group message that is to be sent to said recipients of said group message in response to not detecting a response to said group message that was sent to any user of said group message; and determining whether a response to said follow-up group message was sent and received by all users of said group message within a second threshold amount of time, wherein said second threshold amount of time is determined from a time that said follow-up group message was sent.

3. The computer program product as recited in claim 1, wherein the program code further comprises the programming instructions for:

analyzing content of said monitored messages sent over said communication network to identify questions utilizing natural language processing;

storing a question of a second message from said monitored messages along with identifications of a sender and one or more recipients of said second message containing said question in a database in response to identifying said question in said second message;

detecting a question in said group message;

determining whether said question detected in said group message is similar to a stored question within a threshold degree of similarity; and requesting permission from a sender of said response to said group message to broadcast said response to said sender and said one or more recipients of said second message in response to said question of said second message being within said threshold degree of similarity as said question in said group message.

4. The computer program product as recited in claim 3, wherein said sender and said one or more recipients of said second message are different users than said users of said group message, wherein the program code further comprises the programming instructions for:

determining whether said sender of said response to said group message provided permission to broadcast said response to said sender and said one or more recipients of said second message; and broadcasting said response to said sender and said one or more recipients of said second message in response to receiving permission to broadcast said response to said sender and said one or more recipients of said second message.

5. The computer program product as recited in claim 1, wherein said action item is created during a discussion by a group of people who are meeting about one or more topics and during said discussion it is discovered that an action is needed, wherein said action required is documented as said action item and assigned to a member of said group of people.

6. The computer program product as recited in claim 1, wherein said question presented in said group message is detected using natural language processing, wherein said urgency of said response is determined using natural language processing.

7. The computer program product as recited in claim 1, wherein said response to said group message comprises an individual response from a single user of said users of said group message to said sender of said group message without cc'ing other users who received said group message.

8. The computer program product as recited in claim 1, wherein said action item comprises a documented event, task, activity or action that needs to take place, wherein said threshold amount of time corresponds to a time in which a response to said group message should be received by all users of said group message.

9. The computer program product as recited in claim 1, wherein the program code further comprises the programming instructions for:

analyzing content of said response to said group message for confidential information by identifying any tags associated with said response that indicate that said response contains confidential information in response to determining said group message requires said response and in response to determining that said response to said group message was received by said subset of all users of said group message within said threshold of time.

10. The computer program product as recited in claim 1, wherein said response to said group message was sent to said subset of all users of said group message over a different communication channel than a communication channel used to send said group message, wherein said response to said group message is broadcasted to other users of said group message who had not previously received said response over said communication channel used to send said group message.

11. A system, comprising:

a memory for storing a computer program for ensuring that all users of a group message receive a response to the group message; and a processor connected to the memory, wherein the processor is configured to execute the program instructions of the computer program comprising:

monitoring messages sent over a communication network;

detecting a group message from said monitored messages that was sent to multiple users;

analyzing content of said group message to determine if said group message requires a response and, if so, to assess an urgency of said response, wherein said group message requires a response due to a question or action item presented in said group message;

determining whether a response to said group message was sent and received by all users of said group message within a threshold amount of time based on said urgency of said response in response to said group message requiring said response, wherein said users of said group message comprise a sender and recipients of said group message;

determining whether said response to said group message was sent and received by a subset of all users of said group message within said threshold amount of time in response to determining that said response to said group message was not received by all users of said group message within said threshold amount of time; and broadcasting said response to said group message to other users of said group message who had not previously received said response in response to determining that said response to said group message was received by said subset of all users of said group message within said threshold of time.

12. The system as recited in claim 11, wherein the program instructions of the computer program further comprise:

creating a follow-up group message for said sender of said group message that is populated with said group message that is to be sent to said recipients of said group message in response to not detecting a response to said group message that was sent to any user of said group message; and determining whether a response to said follow-up group message was sent and received by all users of said group message within a second threshold amount of time, wherein said second threshold amount of time is determined from a time that said follow-up group message was sent.

13. The system as recited in claim 11, wherein the program instructions of the computer program further comprise:

analyzing content of said monitored messages sent over said communication network to identify questions utilizing natural language processing;

storing a question of a second message from said monitored messages along with identifications of a sender and one or more recipients of said second message containing said question in a database in response to identifying said question in said second message;

detecting a question in said group message;

determining whether said question detected in said group message is similar to a stored question within a threshold degree of similarity; and requesting permission from a sender of said response to said group message to broadcast said response to said sender and said one or more recipients of said second message in response to said question of said second message being within said threshold degree of similarity as said question in said group message.

14. The system as recited in claim 13, wherein said sender and said one or more recipients of said second message are different users than said users of said group message, wherein the program instructions of the computer program further comprise:

determining whether said sender of said response to said group message provided permission to broadcast said response to said sender and said one or more recipients of said second message; and broadcasting said response to said sender and said one or more recipients of said second message in response to receiving permission to broadcast said response to said sender and said one or more recipients of said second message.

15. The system as recited in claim 11, wherein said action item is created during a discussion by a group of people who are meeting about one or more topics and during said discussion it is discovered that an action is needed, wherein said action required is documented as said action item and assigned to a member of said group of people.

16. The system as recited in claim 11, wherein said question presented in said group message is detected using natural language processing, wherein said urgency of said response is determined using natural language processing.

17. The system as recited in claim 11, wherein said response to said group message comprises an individual response from a single user of said users of said group message to said sender of said group message without cc'ing other users who received said group message.

18. The system as recited in claim 11, wherein said action item comprises a documented event, task, activity or action that needs to take place, wherein said threshold amount of time corresponds to a time in which a response to said group message should be received by all users of said group message.

19. The system as recited in claim 11, wherein the program instructions of the computer program further comprise:

analyzing content of said response to said group message for confidential information by identifying any tags associated with said response that indicate that said response contains confidential information in response to determining said group message requires said response and in response to determining that said response to said group message was received by said subset of all users of said group message within said threshold of time.

20. The system as recited in claim 11, wherein said response to said group message was sent to said subset of all users of said group message over a different communication channel than a communication channel used to send said group message, wherein said response to said group message is broadcasted to other users of said group message who had not previously received said response over said communication channel used to send said group message.

* * * * *